United States Patent [19]

Onoda

[11] Patent Number: 5,795,117
[45] Date of Patent: Aug. 18, 1998

[54] RESIN MOLDING PRODUCT WITH A NUT RECEIVING PORTION

[75] Inventor: Katsuhiko Onoda, Shizuoka-ken, Japan

[73] Assignee: Yazaki Corporation, Tokyo, Japan

[21] Appl. No.: 847,604

[22] Filed: Apr. 25, 1997

[30] Foreign Application Priority Data

Apr. 30, 1996 [JP] Japan .................... 8-109581

[51] Int. Cl.$^6$ .................... F16B 39/02
[52] U.S. Cl. .................... 411/92; 411/104; 411/180; 411/84
[58] Field of Search .................... 411/84, 85, 92, 411/95, 104, 111, 112, 113, 180, 181

[56] References Cited

U.S. PATENT DOCUMENTS

| | | | |
|---|---|---|---|
| 3,969,011 | 7/1976 | Yamada | 411/104 |
| 5,032,047 | 7/1991 | Theakston | 411/104 |
| 5,603,594 | 2/1997 | Lincoln | 411/104 |

*Primary Examiner*—Flemming Saether
*Attorney, Agent, or Firm*—Finnegan, Henderson, Farabow, Garrett & Dunner, L.L.P.

[57] ABSTRACT

A resin molding product with a nut receiving portion of the present invention has a recess 22 for receiving nuts 31 and 32 later. The recess 22 includes a pair of right and left side walls 22c and 22d which abut against outer parallel faces 31b and 32b of respective nuts 31 and 32 to prevent nuts 31 and 32 from being loosened, a pair of front and rear walls 22e which abut against front and rear end faces of respective nuts 31 of 32, a bottom walls 22b which butt against part of outer lower ends of respective nuts 31 and 32 to adjust a length of engagement of nuts 31 and 32, and a nut receiving opening 22a opposite to the bottom wall 22b. Further, the recess formed in the resin molding product includes the front wall which is formed with a notch for inserting a bolt into the nut fitted in the recess; at least one of right and left side walls which is formed with a rib 24 which is scraped by an outer parallel face of the nut when fitting the nut into the recess, and the bottom wall 22b which is formed with spaces 23a and 23b for gathering a scrap of the scraped rib 24.

6 Claims, 4 Drawing Sheets

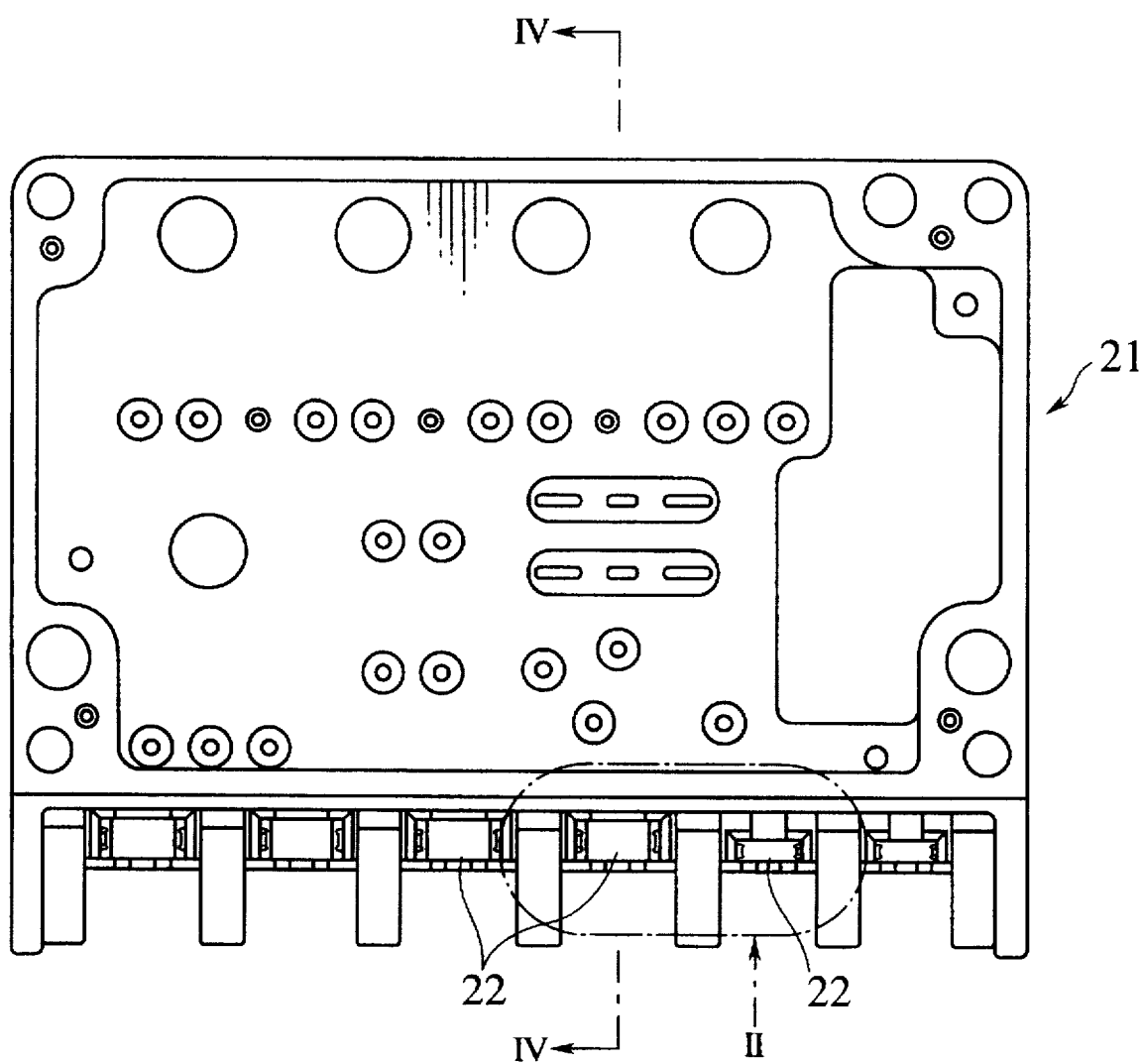

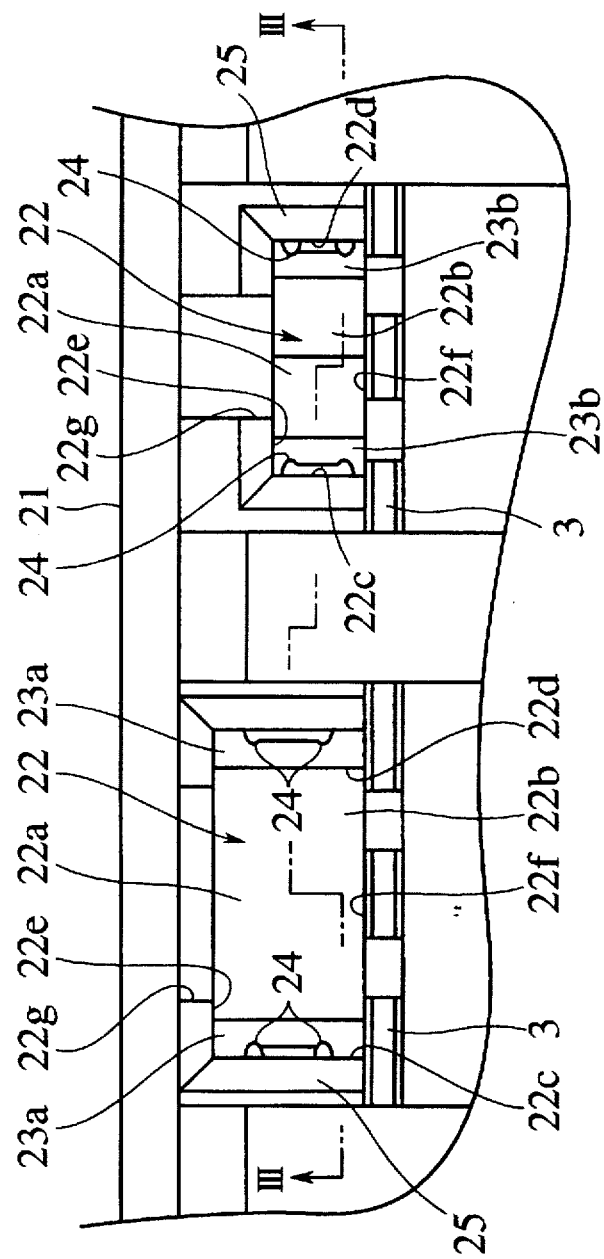

RESIN MOLDING PRODUCT WITH A NUT RECEIVING PORTION

BACKGROUND OF THE INVENTION

1. Field of the Invention

The present invention relates to a resin molding product with a nut receiving portion, which is capable of later fitting a nut into the receiving portion so that parts can be securely attached with use of a bolt.

2. Description of the Related Art

In general, there is a case of electrically connecting an electric connecting terminal such as LA terminal to other members with use of a housing composed of a resin molding product. In such a case, a bolt is often inserted into a nut which is later fitted and fixed into the housing so that the electric connecting terminal can be fixed in a state of being electrically connected with other members.

For example, a bus bar is insert-molded in a housing of a control unit for a power steering motor in automobiles. In the housing, a recess for receiving a nut is formed using the bus bar as a front wall of the recess. Subsequently, a nut is fitted into the recess, and a bolt, in which an electric connecting terminal and a spring washer are fitted, is screwed into the aforesaid nut, whereby the electric connecting terminal is electrically connected to the bus bar.

In the aforesaid structure, if there is a gap between the nut and the recess, the nut is easy to come off from the recess, or it is difficult to accurately position the nut. Therefore, the nut is usually pressed into the recess while rubbing against both side walls of the recess. When the outer parallel face of the nut is rubbed against both side walls of the recess, a contact resistance becomes great. For this reason, it is hard to fit the nut into the recess. In order to avoid such a disadvantage, there has been proposed that the side wall of the recess is formed with a rib projecting from the side wall, and the nut is pressed into the recess while crushing the formed rib.

However, according to the structure of pressing the nut into the recess while crushing the formed rib, a scrap which is scraped from the rib by the nut remains in the bottom of the recess. For this reason, the bottom portion of the nut does not abut against the bottom of the recess. Thus, it is difficult to insert the nut by a proper position on the inside of the recess. This causes a problem that the nut can not be accurately positioned with respect to the resin molding product.

SUMMARY OF THE INVENTION

Taking the aforesaid problem into consideration, an object of the present invention is to provide a resin molding product with a nut receiving portion which is capable of securely positioning a nut on a proper position with respect to the resin molding product even when the nut is pressed into a recess while crushing the rib formed in the recess.

To achieve the object, according to a first aspect of the present invention, there is provided a resin molding product with a nut receiving portion, which includes: a recess for fitting a nut in a direction perpendicular to the screw axis of the nut, the recess being composed of a pair of right and left side walls which abut against outer parallel faces of the nut to prevent the nut from being rotated; a pair of front and rear walls which abut against front and rear end faces of the nut; a bottom wall which butts against an outer lower end portion of the nut to adjust a depth of insertion of the nut; and of an opening which receive the nut and are correspondent to the bottom wall; a notch formed in the front wall for inserting a bolt into the nut fitted in the recess; a rib formed in at least one of the right and left side walls and holding the nut while being pressed and crushed by an outer parallel face of the nut when fitting into said recess; and a space formed on said bottom of said recess for gathering scrap of said rib scraped by fitting said nut into said recess.

With the construction as described above, when the nut is pressed into the recess which is a nut receiving portion of the resin molding product, an outer parallel face of the nut slidably contacts with the rib, and is fitted into the recess while pressing and crushing the rib. And then, the lower end face of the nut abuts against the bottom wall of the recess, so that the nut can be properly positioned. At that time, the rib is scraped by the fitted nut. The scraped scrap falls and gathers in a space formed in the bottom wall of the recess, so that the nut can be properly positioned in a state that its lower end face is securely abutted against the bottom wall of the recess without disturbance due to the scraped scrap. As a result, the nut is positioned on a proper position of the resin molding product, so that a bolt can be easily and securely screwed into the nut by means of an automatic machine, etc.

According to a second aspect of the present invention as it depends from the first aspect, the front wall is constituted by a bus bar which is embedded in the resin molding product as an insert.

In the second aspect, in addition to effect of the invention in the first aspect, part of a bus bar is embedded in the resin molding product by insert molding, and the front wall is constituted by the bus bar. Thus, when a terminal with hole is screwed into the nut fitted in the recess by means of a bolt, the terminal can be securely fixed onto the resin molding product in a state of being electrically connected to the bus bar. In this case, the nut is properly positioned, so that electrical connection of terminal can be easily achieved.

According to a third aspect of the present invention as it depends from the first and second aspects, the nut is a square nut, and the space formed on the bottom wall is formed into a groove-like just under the rib.

In the resin molding product, the bottom wall of the recess for receiving the square nut is provided with a groove-like space, so that the scrap of scraped rib can be gathered in the space and the bottom face of the square nut can be securely abutted against the bottom wall of the recess. Thus, the proper positioning of nut can be achieved.

According to a fourth aspect of the present invention as it depends from the first and second aspects, the nut is a hexagon nut, and the bottom wall has a cross section formed into a triangular shape for receiving an outer angular portion of the hexagon nut, and has an edge portion which is notched so as to define the space.

In the resin molding product, the bottom wall of the recess for receiving the hexagon nut is provided with a space which is defined by forming a notch portion, so that the scrap of scraped rib can be gathered in the space and the angular portion of the lower end face of the hexagon nut can be securely abutted against the bottom wall of the recess. Thus, the proper positioning of nut can be achieved.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 1 is a plan view showing the entire construction of a resin molding product according to an embodiment of the present invention;

FIG. 2 is an enlarged view of a portion I of FIG. 1;

FIG. 3A is a view showing a state before a nut is fitted into a recess; FIG. 3B is a view showing a state after nuts 31 and 32 are fitted into a recess;

FIG. 4A is a view showing a state before a nut is fitted into a recess; FIG. 4B is a view showing a state after nuts 31 and 32 are fitted into the recess.

DETAILED DESCRIPTION OF THE PREFERRED EMBODIMENTS

Figure 3A:
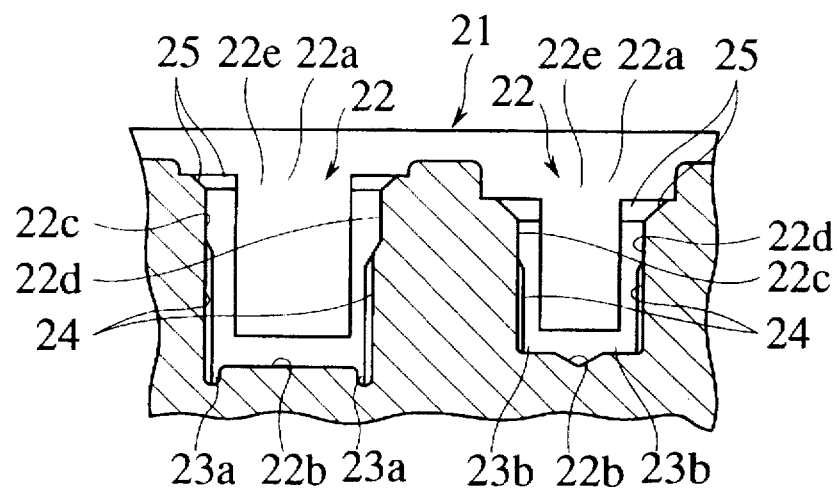
FIG. 3A and FIG. 3B are individually cross sectional views cut along with a line III—III of FIG. 2, and also.

There will be detailed below the preferred embodiments of the present invention with reference to the accompanying drawings. Like members are designated by like reference characters.

FIG. 1 is a plan view showing a housing 21 of a control unit of a power steering motor in an automobile. The housing 21 is equivalent to a resin molding product. One side of the housing 21 is formed with many recesses 22 for later fitting a nut therein.

Figure 3B:
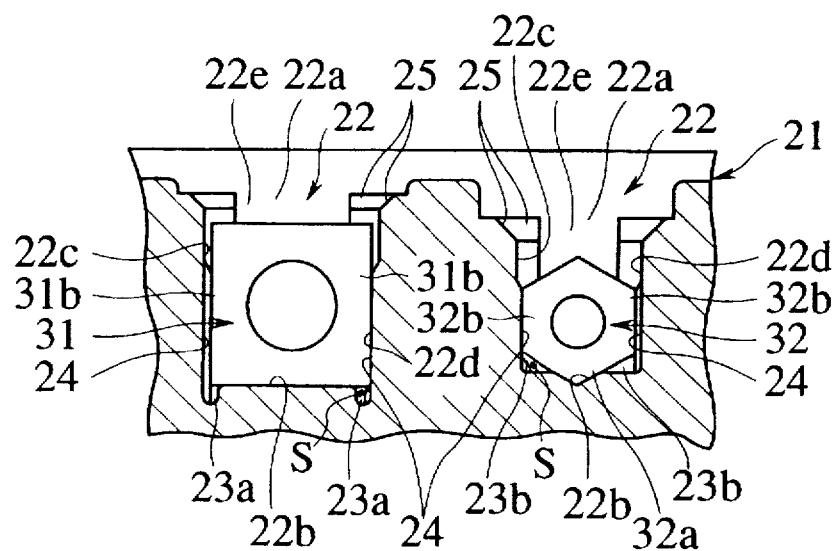
Figure 4A:
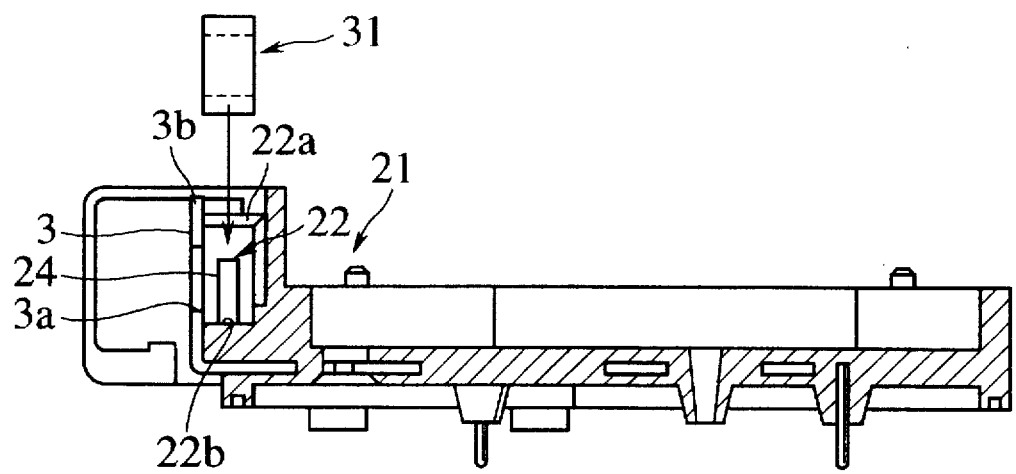
FIG. 4A and FIG. 4B are individually cross sectional views cut along with a line IV—IV of FIG. 1, and also.
Figure 4B:
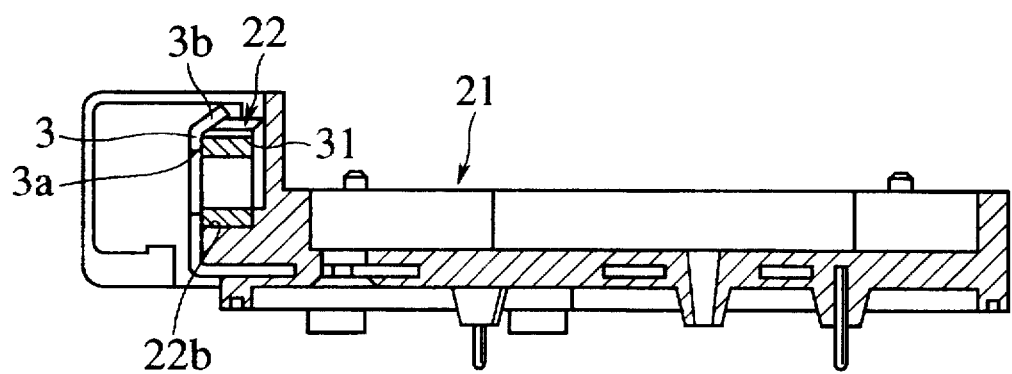

FIG. 2 is an enlarged view of part of the recesses 22, and FIG. 3A and FIG. 3B are individually cross sectional views cut along with the line III—III of FIG. 2. FIG. 4A and FIG. 4B are individually cross sectional views cut along with the line IV—IV of FIG. 1. FIG. 3A and FIG. 4A each show a state before a nut is fitted into the recess; on the other hand, FIG. 3B and FIG. 4B each show a state after a nut is fitted into the recess.

The recess 22 includes a pair of right and left side walls 22c and 22d which abut against outer parallel faces 31b and 32b (see FIG. 3B) of respective nuts 31 and 32 so as to prevent nuts 31 and 32 from being loosened, a pair of front and rear walls 22e and 22f which abuts against front and rear end faces of respective nuts 31 of 32, bottom walls 22b which butt against outer lower ends of respective nuts 31 and 32 to adjust a length of engagement of nuts 31 and 32, and openings 22a which receive nuts 31 and 32 and are opposite to the bottom walls 22b. As shown in FIG. 4, a bus bar 3 is embedded in the housing 21 by insert molding. Part of the bus bar 3 is bent into a shape of L, and is exposed on the side of the housing 21. The exposed portion of the bus bar 3 constitutes the aforesaid front wall 22f of the recess.

A periphery portion of the opening 22a of the recess 22 is formed with a chamfer 25 for easily receiving nuts 31 and 32. Also, as shown in FIG. 4A and FIG. 4B, the front wall 22f (part of bus bar) is formed with a hole (notch) 3a for inserting a bolt into the received respective nuts 31 and 32. Each of right and left side walls 22c and 22d is formed with a rib 24 which is pressed and crushed by the outer parallel faces 31b and 32b of the nuts 31 and 32 when nuts 31 and 32 is fitted into the recess.

The rib 24 projects from the side wall of the recess and extends in the longitudinal direction by a dimension capable of inserting nuts 31 and 32. Therefore, the parallel faces 31b and 32b of nuts 31 and 32 abut against only distal end portion of the rib 24. Also, the rear walls 22e is formed with a relief notch 22g for the distal end portion of the bolt. Each of the bottom walls 22b is formed with spaces 23a and 23b for gathering scraps of the rib 24 scraped by fitting nuts 31 and 32 into the recess.

As seen from FIG. 3A and FIG. 3B, the recess 22 on the left-hand side of the figure is a portion for receiving a square nut 31. Further, a groove-like space 23a is formed on the flat bottom wall 22b at a portion just under the rib 24. On the other hand, the recess 22 on the right-hand side of the figure is a portion for receiving a hexagon nut 32. The bottom wall 22b has a cross section formed into a triangular shape so that an angular portion 32a of the nut 32 can be received. Further, the bottom wall 22b has an edge portion which is notched so as to form spaces 23a and 23b.

The following is an explanation about inserting nuts and effect of the present invention.

As shown in FIG. 3B, when each nuts 31 and 32 is fitted into each recess 22 through the opening 22a in a direction perpendicular to a direction of the screw axis of the each nuts 31 and 32, the outer parallel faces 31b and 32b of nuts 31 and 32 slidably contact with ribs 24 formed on both side walls 22c and 22d, and these nuts are received in the respective recesses 22 while pressing and crushing the ribs 24. Subsequently, lower end portions of these nuts 31 and 32 butt against the bottom walls 22b. At that time, the ribs 24 is scraped off by pressing the nuts 31 and 32. However, the scrap of the scraped rib falls into the spaces 23a and 23b formed on the bottom wall 22b, and remains therein. Thus, the lower end face of the square nut 31 and the lower angular portion 32a of the hexagon nut 32 are securely abutted against the bottom walls 22b, so that these nut 31 and 32 can be properly positioned in their insertion lengthwise direction. Moreover, these nuts 31 and 32 are pressed by the crushed rib, so that they can be held in the recesses without shacking. Also, the distal end portion 3b of the bus bar 3 is bent so as to cover the upper side of the nuts 31 and 32 after nuts 31 and 32 are fitted into the recesses, so that these nuts 31 and 32 can be prevented from coming off the recesses.

The rib 24 is not always formed on both side walls 22c and 22d of the recesses 22. The rib 24 may be formed on only one of both side walls. Moreover, the front wall 22f made of a resin may be used in place of constituting the front wall of the recess 22 with use of the bus bar 3. In such a case, the front wall made of a resin may be formed with a notch (such as a hole and a groove) for inserting a bolt.

While preferred embodiments of the present invention have been described using specific terms, such description is for illustrative purposes, and it is to be understood that changes and variations may be made without departing from the spirit or scope of the following claim.

What is claimed is:

1. A resin molding product with a nut receiving portion, comprising:

a recess to be fitted with a nut in a direction perpendicular to the screw axis of said nut, said recess being composed of a pair of right and left side walls which abut against outer parallel faces of said nut to prevent said nut from being rotated, a pair of front and rear walls which abut against front and rear end faces of said nut, a bottom wall to butt against an outer lower end portion of said nut to adjust a depth of insertion of said nut, and an opening to receive said nut and which is opposite to the bottom wall;

a notch formed in said front wall for inserting a bolt to be meshed with said nut to be fitted in said recess;

a rib formed in at least one of said right and left side walls, the rib holding said nut while the rib is pressed and crushed by an outer parallel face of said nut when the nut is fitted into said recess; and a space formed on said bottom wall of said recess for gathering scrap of said rib scraped when said nut is fitted into said recess.

2. The resin molding product with a nut receiving portion according to claim 1, wherein said front wall is constituted by a bus bar which is embedded in the resin molding product as an insert.

3. The resin molding product with a nut receiving portion according to claim 1, wherein said nut to be fitted into the recess is a square nut, and said space formed on said bottom wall is formed into a groove just under said rib.

4. The resin molding product with a nut receiving portion according to claim 2, wherein said nut to be fitted into the recess is a square nut, and said space formed in said bottom wall just under the rib is formed into a groove just under said rib.

5. The resin molding product with a nut receiving portion according to claim 1, wherein said nut to be fitted into the recess is a hexagon nut formed into a triangular shape to receive an outer angular portion of said hexagon nut and an edge portion which is notched so as to define said space.

6. The resin molding product with a nut receiving portion according to claim 2 wherein said nut to be fitted into the recess is a hexagon nut, and said bottom wall has a cross section formed into a triangular shape to receive an outer angular portion of said hexagon nut and an edge portion which is notched so as to define said space.

* * * * *

UNITED STATES PATENT AND TRADEMARK OFFICE
CERTIFICATE OF CORRECTION

PATENT NO. : 5,795,117
DATED : August 18, 1998
INVENTOR(S) : Katsuhiko ONODA

It is certified that error appears in the above-indentified patent and that said Letters Patent is hereby corrected as shown below:

Title Page, Item [57], in the Abstract, line 8, "walls" should read --wall--.

Claim 5, Column 6, line 3, after "nut", insert --, and said bottom wall has a cross section--.

Signed and Sealed this

Twenty-second Day of June, 1999

Attest:

Q. TODD DICKINSON

*Attesting Officer*   *Acting Commissioner of Patents and Trademarks*